(12) United States Patent
Lee et al.

(10) Patent No.: US 8,712,161 B2
(45) Date of Patent: Apr. 29, 2014

(54) IMAGE MANIPULATING SYSTEM AND METHOD

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 864 days.

(21) Appl. No.: 12/779,711

(22) Filed: May 13, 2010

(65) Prior Publication Data

US 2011/0170774 A1 Jul. 14, 2011

(30) Foreign Application Priority Data

Jan. 12, 2010 (CN) .......................... 2010 1 0300226

(51) Int. Cl.
*G06K 9/46* (2006.01)
*G06K 9/00* (2006.01)

(52) U.S. Cl.
USPC ......................................... 382/195; 382/165

(58) Field of Classification Search
USPC .......................... 382/218, 195, 165
See application file for complete search history.

(56) References Cited

U.S. PATENT DOCUMENTS

| | | | | |
|---|---|---|---|---|
| 4,771,471 A * | 9/1988 | Kitamura | ...................... | 382/269 |
| 5,091,972 A * | 2/1992 | Kwon et al. | .................. | 382/277 |
| 6,151,410 A * | 11/2000 | Kuwata et al. | ................. | 382/167 |
| 6,456,737 B1 * | 9/2002 | Woodfill et al. | ............. | 382/154 |
| 6,707,940 B1 * | 3/2004 | Qian | ............................. | 382/173 |
| 7,215,365 B2 * | 5/2007 | Cooper | ....................... | 348/223.1 |
| 7,903,898 B2 * | 3/2011 | Ito et al. | ......................... | 382/254 |
| 8,077,234 B2 * | 12/2011 | Takemura et al. | ............ | 348/280 |
| 8,144,222 B2 * | 3/2012 | Kanemitsu et al. | ............ | 348/273 |
| 8,164,594 B2 * | 4/2012 | Watanabe et al. | ............. | 345/426 |
| 8,228,407 B2 * | 7/2012 | Egawa | .......................... | 348/272 |
| 8,295,626 B2 * | 10/2012 | Zhou et al. | ..................... | 382/251 |
| 2001/0008418 A1 * | 7/2001 | Yamanaka et al. | ............ | 348/222 |
| 2002/0039436 A1 * | 4/2002 | Alumot et al. | ................. | 382/149 |
| 2002/0051056 A1 * | 5/2002 | Holtslag et al. | ............... | 348/135 |
| 2002/0196350 A1 * | 12/2002 | Cooper | ....................... | 348/223.1 |
| 2003/0152280 A1 * | 8/2003 | Kadowaki et al. | ............ | 382/240 |
| 2004/0218807 A1 * | 11/2004 | Alumot et al. | ................. | 382/149 |
| 2005/0025384 A1 * | 2/2005 | Ming-Jeu | ...................... | 382/268 |
| 2005/0074177 A1 * | 4/2005 | Ichimura et al. | .............. | 382/240 |
| 2005/0104974 A1 * | 5/2005 | Watanabe et al. | ........... | 348/222.1 |
| 2005/0220338 A1 * | 10/2005 | Qian et al. | ..................... | 382/165 |
| 2007/0248282 A1 * | 10/2007 | Suzuki | .......................... | 382/282 |
| 2008/0031531 A1 * | 2/2008 | Hara | ............................... | 382/237 |
| 2008/0123943 A1 * | 5/2008 | Sato et al. | ...................... | 382/162 |
| 2008/0226138 A1 * | 9/2008 | Suzuki et al. | ................. | 382/117 |
| 2008/0240598 A1 * | 10/2008 | Hasegawa | ...................... | 382/254 |
| 2009/0148033 A1 * | 6/2009 | Alumot et al. | ................. | 382/149 |

(Continued)

FOREIGN PATENT DOCUMENTS

CN 101196981 A 6/2008
CN 101604385 A 12/2009

*Primary Examiner* — Kathleen Y Dulaney
(74) *Attorney, Agent, or Firm* — Novak Druce Connolly Bove + Quigg LLP

(57) ABSTRACT

An image information acquiring system obtains a group of relative values to describe the image. A pixel value of each pixel in the image is acquired. Ratios between the pixel value of each pixel and a pixel value of each other pixel which is adjacent to the pixel are obtained for obtaining the group of relative values. The group of relative values is used for comparing two images or reproducing another image.

4 Claims, 7 Drawing Sheets

(56) References Cited

U.S. PATENT DOCUMENTS

| | | | |
|---|---|---|---|
| 2010/0046859 A1* | 2/2010 | Hitomi et al. | 382/300 |
| 2010/0177203 A1* | 7/2010 | Lin | 348/222.1 |
| 2010/0303283 A1* | 12/2010 | Bradley | 382/100 |
| 2011/0033085 A1* | 2/2011 | Kubota | 382/103 |
| 2011/0075933 A1* | 3/2011 | Hong et al. | 382/190 |

* cited by examiner

IMAGE MANIPULATING SYSTEM AND METHOD

BACKGROUND

1. Technical Field

The present disclosure relates to images.

2. Description of Related Art

Image identification method is used in many fields. Conventional identification method compares the pixel values of pixels in two images to determine similarities between the two images. However, if two images have the same content but different color gradations, the two images are determined to be different. Therefore, the present system is not accurate.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
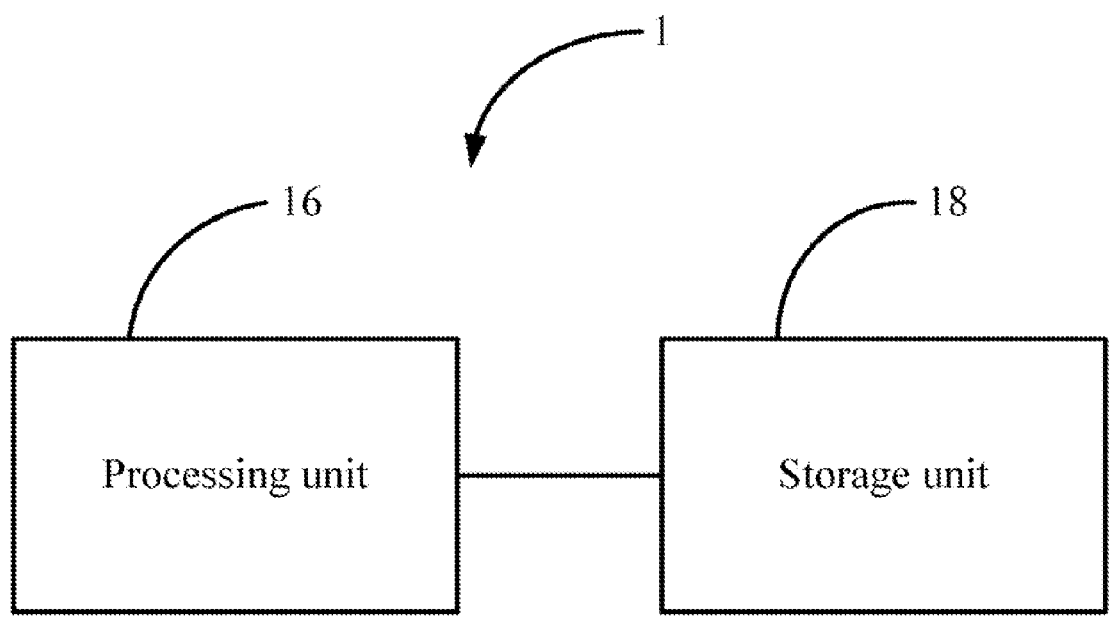
FIG. 1 is a block diagram of an exemplary embodiment of an image information acquiring system, the image information acquiring system includes a storage unit.

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

Referring to FIG. 1, an exemplary embodiment of an image information acquiring system 1 includes a processing unit 16 and a storage unit 18. The image information acquiring system 1 is operable to obtain information of an image. The information for the image may be used for a plurality of functions such as identifying images, and rebuilding images. In other words, users can compare information for two images to determine whether the two images are the same, and can produce an image according to the information.

Figure 2:
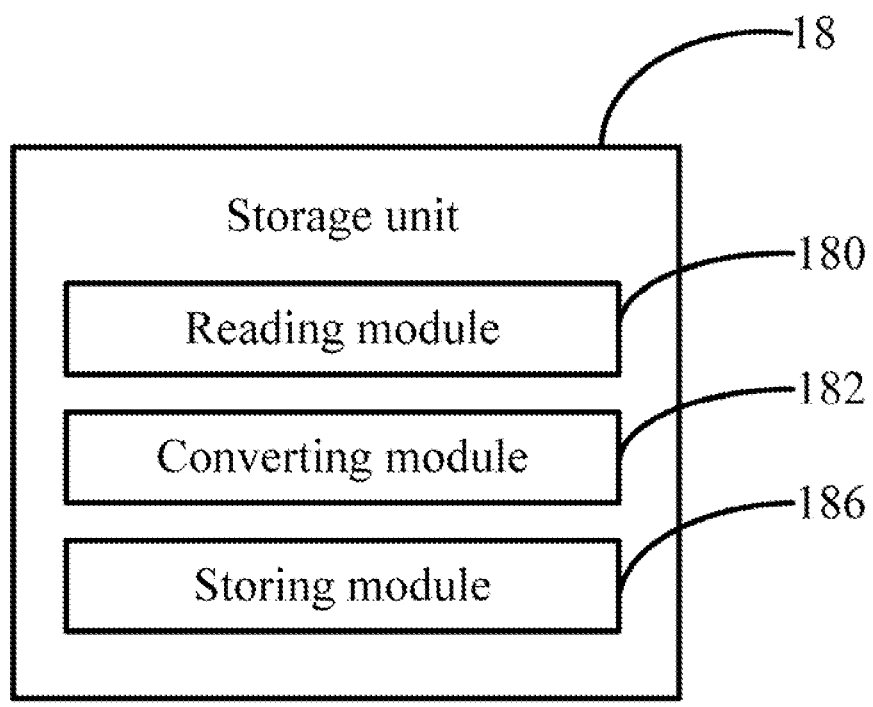
FIG. 2 is a block diagram of an exemplary embodiment of the storage unit of FIG. 1.

Referring to FIG. 2, the storage unit 18 includes a reading module 180, a converting module 182, and a storing module 186. The reading module 180 and the converting module 182 may include one or more computerized instructions that are executed by the processing unit 16.

Figure 3:
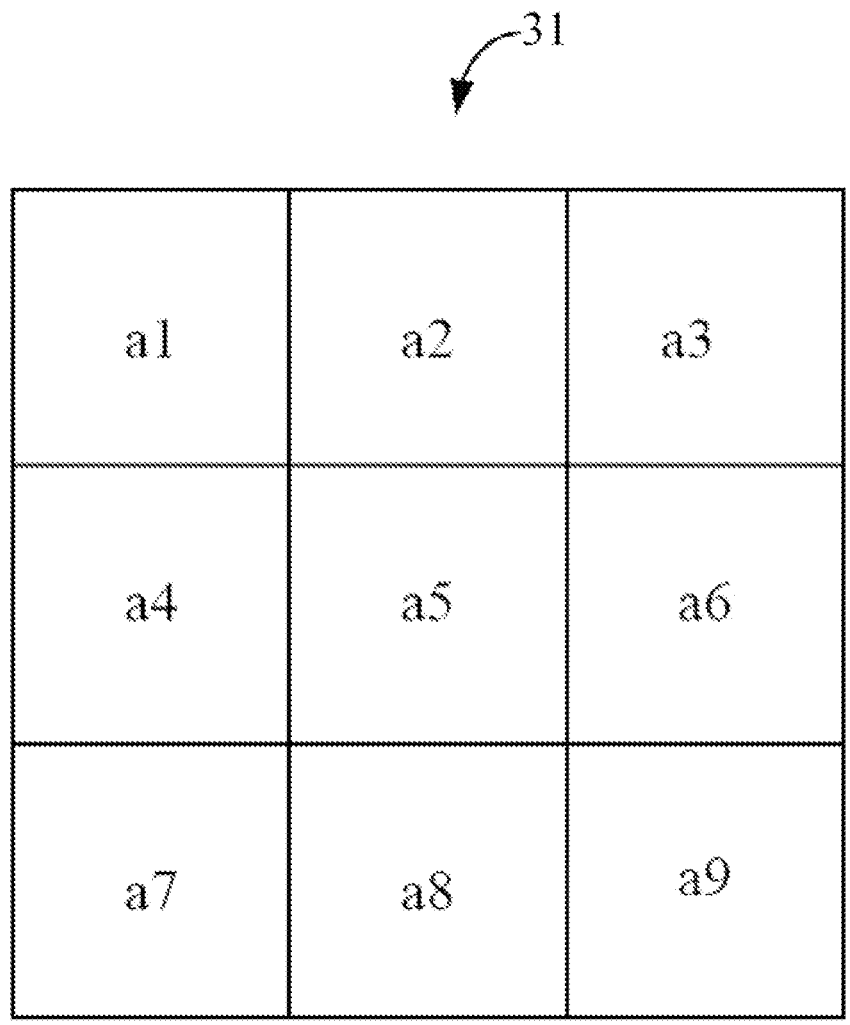
FIG. 3 is a schematic diagram of a first image.

Referring to FIG. 3, a first image 31 includes first to ninth (3*3) pixels a1-a9. The reading module 180 acquires a pixel value of each pixel in the first image 31.

The converting module 182 calculates the ratios between the pixel value of the first pixel a1 and a pixel value of each of the other pixels (adjacent pixels) which are adjacent to (centering around) the first pixel a1, to obtain a relative value for the first pixel a1. Similar to the first pixel a1, the converting module 182 obtains a relative value for each pixel. The relative values for all of the pixels a1-a9 in the first image 31 are stored in the storing module 186 and regarded as the information for the first image 31.

For example, the pixel values of the pixels a1-a9 in the first image 31 are "120", "65", "90", "65", "65", "0", "90", "0", "120". The first pixel a1 is adjacent to the second pixel a2, the fourth pixel a4, and the fifth pixel a5. The ratios between the pixel value of the first pixel a1 and a pixel value of each other pixels a2, a4, a5 which are adjacent to the first pixel a1 are 65/120=0.541, 65/120=0.541, and 65/120=0.541. In addition, the second pixel a2 is on the right side of the first pixel a1. The fourth pixel a4 is on the bottom of the first pixel a1. The fifth pixel a5 is on the bottom-right side of the first pixel a1. As a result, the relative value for the first pixel a1 is (R/0.541, B/0.541, BR/0). The relative value includes the ratios and orientations. Similar to the first pixel a1, the second pixel a2 is adjacent to the first pixel a1, the third pixel a3, the fourth pixel a4, the fifth pixel a5, and the sixth pixel a6. The ratios between the pixel value of the second pixel a2 and pixel values of the first pixel a1, the third pixel a3, the fourth pixel a4, the fifth pixel a5, and the sixth pixel a6 which are adjacent to the first pixel a1 are 120/65=1.846, 90/65=1.384, 65/65=1, 65/65=1, and 0/65=0. In addition, the first pixel a1 is on the left side of the second pixel a2. The third pixel a3 is on the right side of the second pixel a2. The fourth pixel a4 is on the bottom-left side of the second pixel a2. The fifth pixel a5 is on the bottom of the second pixel a2. The fifth pixel a5 is on the bottom-right side of the second pixel a2. As a result, the relative value for the second pixel a2 is (L/1.846, R/1.384, BL/1, B/1, BR/0).

In this embodiment, the first image 31 are gray, such that each of the first to ninth pixels a1-a9 has one pixel value. In other embodiment, if the first image 31 is chromatic, each of the first to ninth pixels a1-a9 has three values including an R value, a G value, and a B value. At this condition, the relative value for the first pixel a1 includes a plurality of groups of ratios. Each group of ratios includes an R value ratio, a G value ratio, and a B value ratio.

In other embodiments, the relative value can omit the orientations. The ratios in the relative value for each pixel may be arranged in series according to orientations of the adjacent pixel relative to the pixel. For example, the pixel a5 is adjacent to the first to fourth pixel a1-a4 and the sixth to ninth pixel a6-a9. The ratios between the pixel value of the fifth pixel a5 and pixel values of the other pixels which are adjacent to the fifth pixel a5 are 120/65=1.846, 65/65=1, 90/65=1.384, 65/65=1, 0/65=0, 90/65=1.384, 0/65=0, and 120/65=1.846. The nine ratios are arranged in series according to the orientations of "the top-left side", "the top", "the top-right side", "the left side", "the right side", "the bottom-left side", "the bottom", and "the bottom-right side". As a result, the relative value for the fifth pixel a5 is (1.846, 1, 1.384, 1, 0, 1.384, 0, 1.846). In addition, such as the second pixel a2, the fourth pixel a4, and the fifth pixel a5 are adjacent to the first pixel a1. In other words, there is no pixel on the left side, the bottom-left side, the top-left side, and the top-right side of the first pixel a1. In this condition, the relative value for the first pixel a1 is (#, #, #, #, 0.541, #, 0.541, 0.541). In other words, upon the condition that there is no pixel at an orientation of the pixel, the relative value at the orientation is marked as a character, such as "#".

For a black pixel, such as the sixth pixel a6 and the eighth pixel a8, the ratios between the pixel value of the sixth pixel a6 or the eighth pixel a8 and pixel values of the other pixels which are adjacent to the sixth pixel a6 or the eighth pixel a8 are regarded as a number "255". As a result, the relative value for the sixth pixel a6 or the eighth pixel a8 is (255, 255, 255, 255, . . . ).

Figure 4:
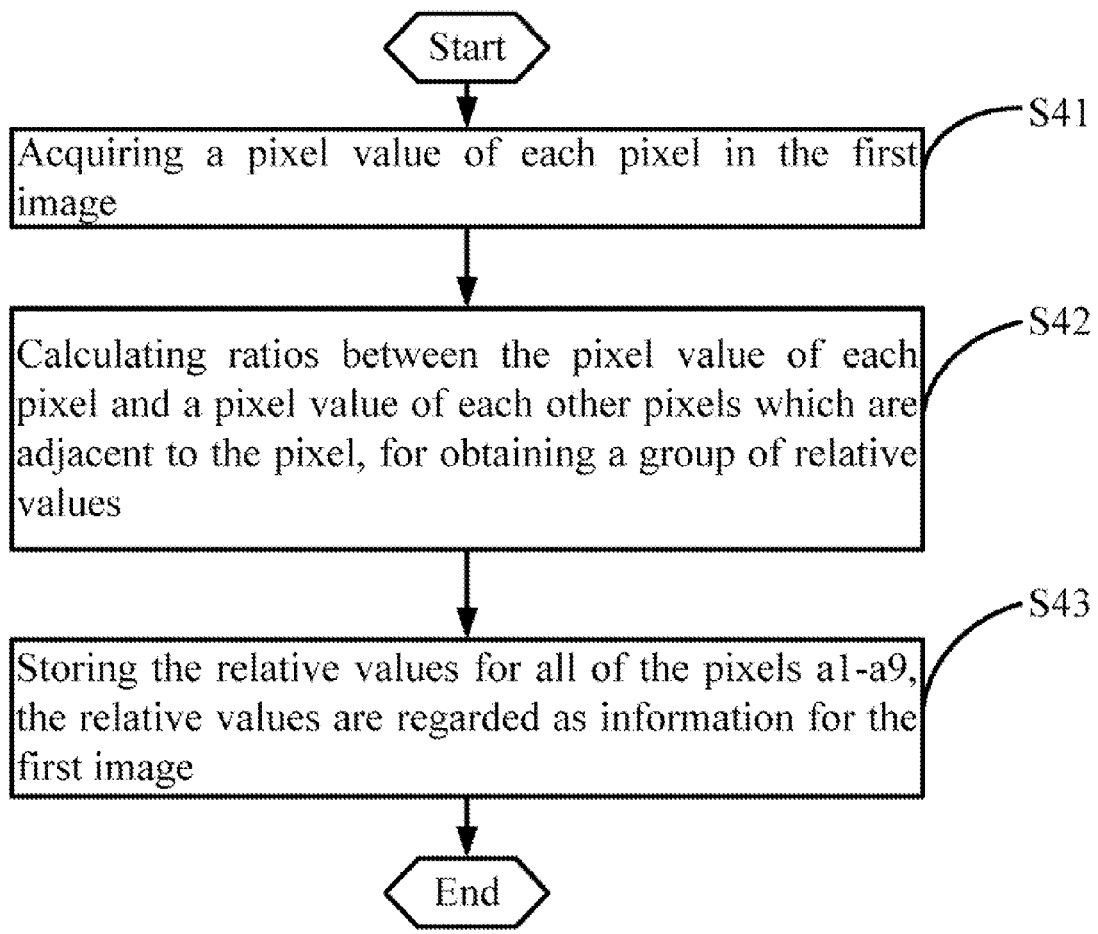
FIG. 4 is a flowchart of an exemplary embodiment of an image information acquiring method.

Referring to FIG. 4, an exemplary embodiment of an image information acquiring method includes the following steps.

In step S41, the reading module 180 acquires a pixel value of each pixel in the first image 31.

In step S42, the converting module 182 calculates ratios between the pixel value of the first pixel a1 and a pixel value of each other pixels which are adjacent to the first pixel a1, to obtain a relative value for the first pixel a1. Similar to the first pixel a1, the converting module 182 obtain a relative value for each pixel. As a result, a plurality of relative values corresponding to all of the pixels a1-a9 are obtained.

In step S43, the relative values for all of the pixels a1-a9 in the first image 31 are stored in the storing module 186 and regarded as an information for the first image 31.

Figure 5:
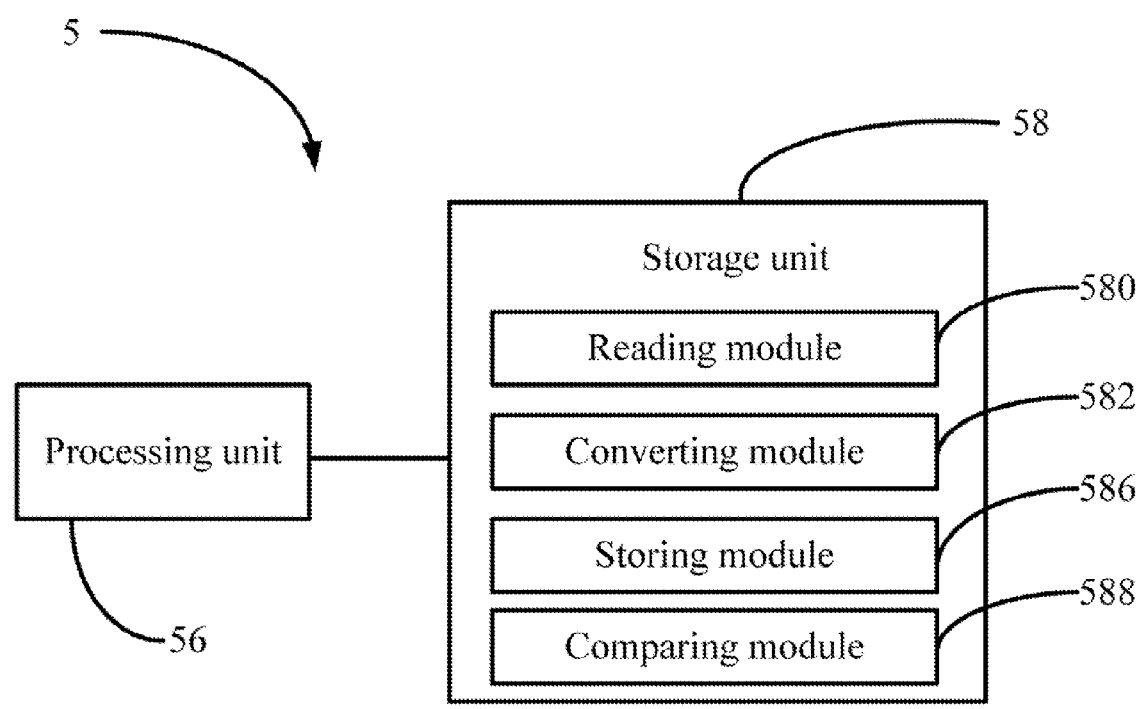
FIG. 5 is block diagram of an exemplary embodiment of an image comparing system including the image information acquiring system of FIG. 1.

Referring to FIG. 5, an exemplary embodiment of an image comparing system 5 includes a processing unit 56 and a storage unit 58. The image comparing system 5 is operable to determine whether two images are the same.

The storing unit 58 includes a reading module 580, a converting module 582, a storing module 586, and a comparing module 588. The reading module 580, the converting module 582, and the comparing module 588 may include one or more computerized instructions that are executed by the processing unit 56.

The reading module 580 and the converting module 582 are the same as the reading module 180 and the converting module 182 in FIG. 2 respectively. The converting module 582 obtains two groups of relative values for the two images respectively. The comparing module 588 compares the two groups of relative values to determine whether the two images are the same. If the comparison shows the two groups of the relative values are an 80% or higher match, the two images are regarded as the same. The choice of 80% can be preset and be any suitable value. Otherwise, the two images are regarded as different, that is if the comparison shows a likeness of less than 80%, the two images are considered as two different images.

Figure 6:
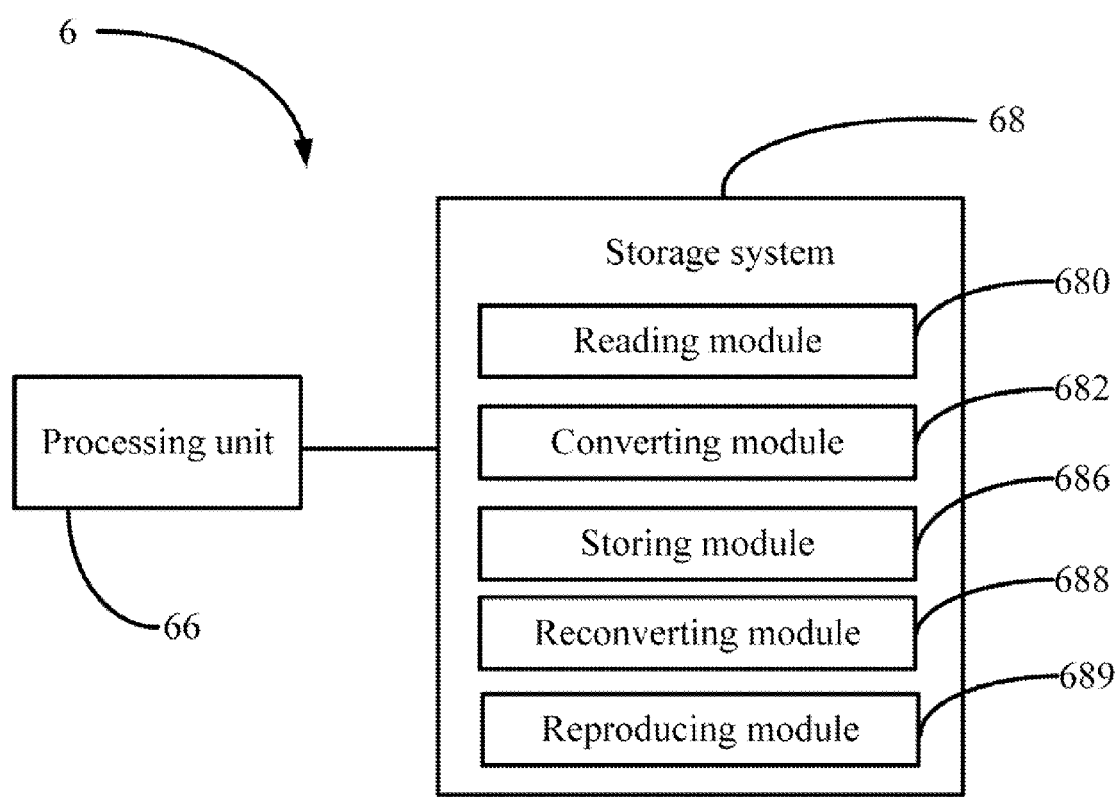
FIG. 6 is block diagram of an exemplary embodiment of an image reproducing system including the image information acquiring system of FIG. 1.
Figure 7:
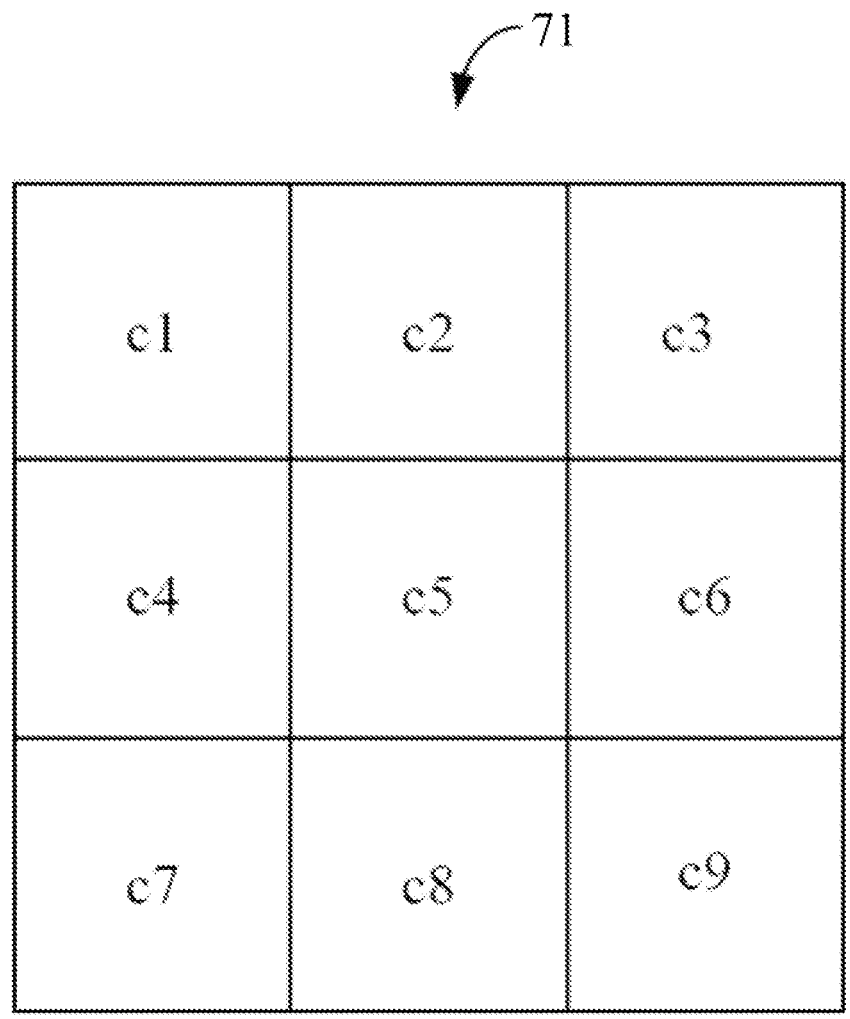
FIG. 7 a schematic diagram of a second image, the second image being obtained from the first image in FIG. 3 by the image reproducing system in FIG. 6.

Referring to FIG. 6, an exemplary embodiment of an image reproducing system 6 includes a processing unit 66 and a storage unit 68.

The storing unit 68 includes a reading module 680, a converting module 682, a storing module 686, a reconverting module 688, and a reproducing module 689. The reading module 680, the converting module 682, the reconverting module 688, and the reproducing module 689 may include one or more computerized instructions that are executed by the processing unit 66.

The reading module 680 and the converting module 682 are the same as the reading module 180 and the converting module 182 in FIG. 2 respectively. The reading module 680 and the converting module 682 obtain a group of relative values for the first image 31.

The reconverting module 688 reads the group of relative values for the first image 31 stored in the storing module 686, and gives each pixel a pixel value according to the group of relative values. The pixel values of the pixel may be different from the pixel values of the pixels in the first image 31, but the ratios between the pixel values of the pixels are the same as the ratios in the first image 31.

The reproducing module 689 produces the second image 71 according to the pixel values obtained by the reproducing module 688. The second image 71 has a same content with the first image 31, but maybe a different size or a different color gradations.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An image information acquiring system comprising:
   a processing unit;
   a storage unit connected to the processing unit and storing a plurality of programs to be executed by the processing unit, wherein the storage unit comprises:
      a reading module to acquire a pixel value of each pixel in an image;
      a converting module to calculate a relative value of each pixel comprising ratios between the pixel value of the each pixel and the pixel values of adjacent pixels centering around the each pixel, and to obtain a group of relative values for all pixels in the image; and
      a storing module to store the group of relative values;
   wherein the pixel value of each pixel comprises an R value, a G value, and a B value, each ratio between the pixel value of the each pixel and the pixel values of adjacent pixels centering around the each pixel comprises a ratio between the R value of the each pixel and the R value of each of the adjacent pixels, a ratio between the G value of the each pixel and the G value of each of the adjacent pixels, and a ratio between the B value of the each pixel and the B value of each of the adjacent pixels; the group of relative values comprises the ratios between the pixel value of the each pixel and the pixel values of the adjacent pixels centering around the each pixel, the ratios are arranged in series according to orientations of the adjacent pixels relative to the pixel; wherein upon the condition that there is no pixel at an orientation of the pixel, the relative value at the orientation is marked as a character.

2. The image information acquiring system of claim 1, wherein the group of relative values comprises the ratios between the pixel value of the each pixel and the pixel values of the adjacent pixels centering around the each pixel, and characters representing orientations of the adjacent pixels relative to the pixel.

3. An image reproducing system comprising:
   a processing unit;
   a storage unit connected to the processing unit and storing a plurality of programs to be executed by the processing unit, wherein the storage unit comprises:

a reading module to acquire a first pixel value of each pixel in an image respectively;

a converting module to calculate a relative value of each pixel comprising ratios between the first pixel value of the each pixel and the first pixel values of adjacent pixels centering around the each pixel, and to obtain a group of relative values corresponding to the image;

a storing module to store the group of relative values;

a reconverting module to give each pixel a second pixel value according to the group of relative values; and a reproducing module to produce another image according to the second pixel values;

wherein the group of each of relative values comprises the ratios between the first pixel value of the each pixel and the first pixel values of the adjacent pixels centering around the each pixel, the ratios are arranged in series according to orientations of the adjacent pixels relative to the pixel; wherein upon the condition that there is no pixel at an orientation of the pixel, the relative value at the orientation is marked as a character.

4. The image reproducing system of claim 3, wherein the group of each of relative values comprises the ratios between the first pixel value of the each pixel and the adjacent pixels centering around the each pixel, and characters representing orientations of the adjacent pixels relative to the each pixel.

* * * * *